(No Model.)
J. ALLEN.
HAY RAKE AND GATHERER.
No. 372,783. Patented Nov. 8, 1887.
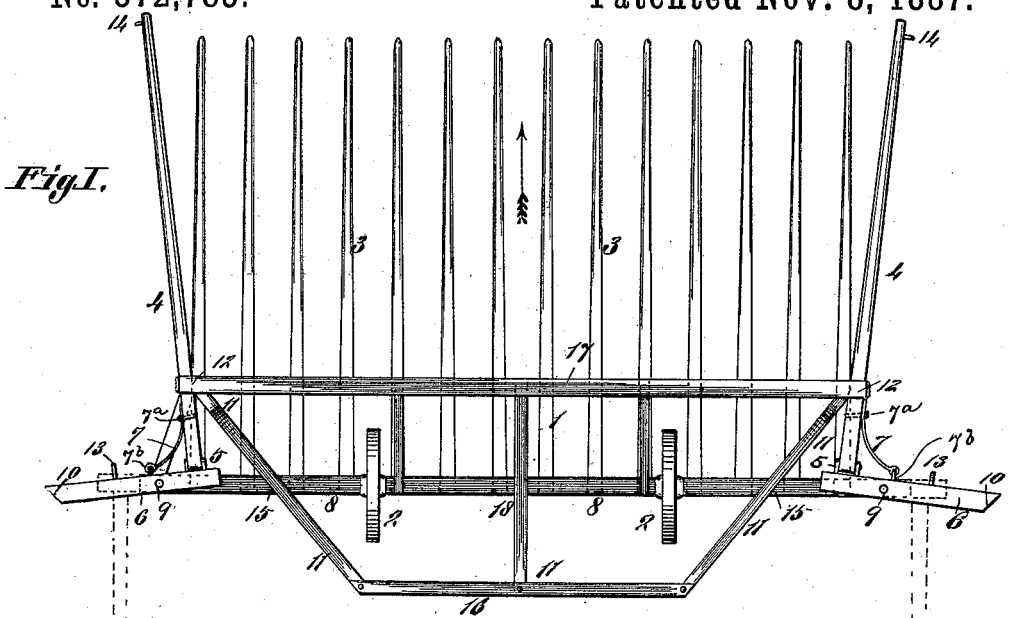
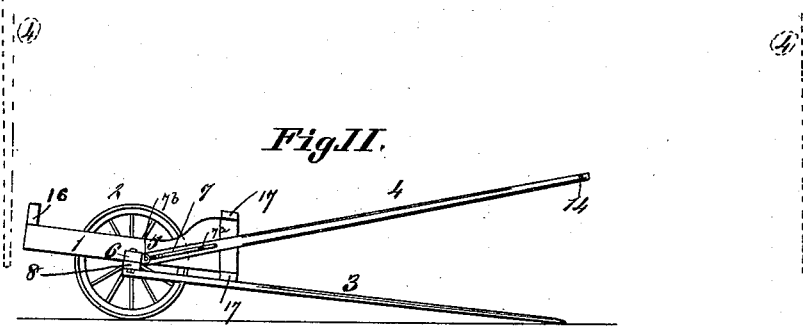
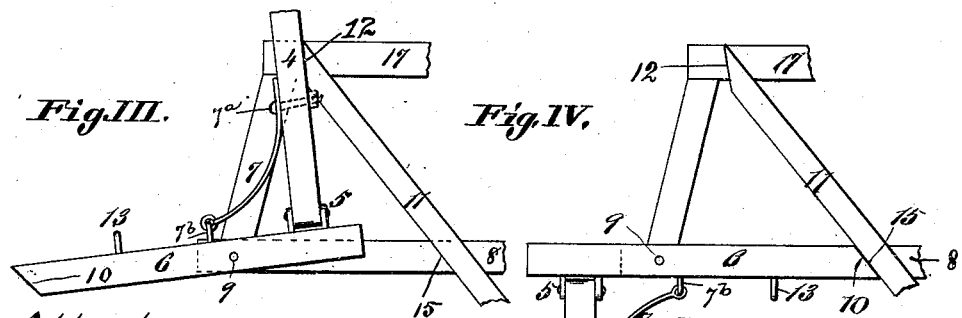
Attest:
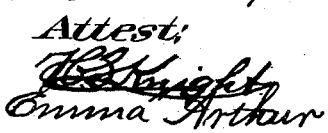
Inventor:
Judson Allen
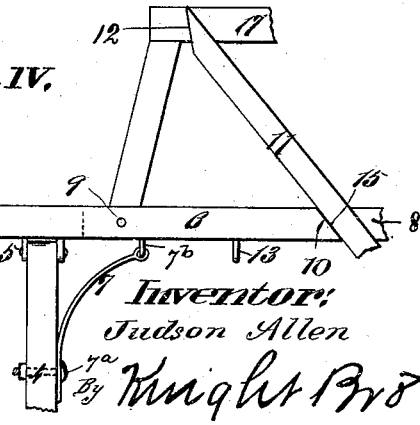

United States Patent Office.

JUDSON ALLEN, OF HANNIBAL, MISSOURI, ASSIGNOR OF ONE-HALF TO ROBERT ELLIOTT AND FRANK W. WYMAN, BOTH OF SAME PLACE.

HAY RAKE AND GATHERER.

SPECIFICATION forming part of Letters Patent No. 372,783, dated November 8, 1887.

Application filed February 15, 1887. Serial No. 227,691. (No model.)

*To all whom it may concern:*

Be it known that I, JUDSON ALLEN, of Hannibal, in the county of Marion and State of Missouri, have invented certain new and useful Improvements in Hay Rakes and Gatherers, of which the following is a full, clear, and exact description, reference being had to the accompanying drawings, forming part of this specification, and in which—

Figure I is a top or plan view of my improved rake and gatherer. Fig. II is a side elevation thereof. Figs. III and IV are enlarged detail views illustrating the operation of the draft-arm and its stop.

My invention relates to an improved device for raking, gathering, and moving hay; and it consists in features of novelty, hereinafter fully described, and pointed out in the claim.

Referring to the drawings, 1 represents the rake-frame; 2, supporting wheels or runners under the rake-frame; and 3, the projecting teeth which gather or rake up the hay.

4 represents draft arms, which, when in position for use, are substantially in line, though slightly at an angle with the teeth 3. These arms are hinged by their inner ends at 5 to short arms 6, and are preferably further connected by means of braces 7, secured at one end to the draft-arms by bolts 7$^a$ and at the other end to lugs 7$^b$ on the short arms, as shown. The arms 6 are pivoted to a cross-piece, 8, of the frame 1 by means of bolts 9, beyond which each has a projecting end, 10.

11 represents a draft-frame fitting upon and secured to the rake-frame. The end pieces of this draft-frame are made inclined, as shown in Fig. I, and when the arms 4 are in the position shown in Figs. I and III they bear at 12 against the front points of the end pieces of the draft-frame, which holds them from coming back in line with the teeth 3, so that the animal is held a short distance from the teeth at each end of the rake. The animal is hitched to the arms 6 at each end of the rake a short distance outside of the pivot 9, and to provide a means of attachment I have shown a hook or clip, 13, on the arm to receive a singletree, and have also shown a clip or hook, 14, at the end of each arm 4, to which the animal is also secured at this portion. It will thus be seen that when the rake is moving in the direction indicated by the arrow in Fig. I, that each animal will be held a proper distance from the teeth of the rake, and that, if it is desired to back the apparatus, it may be done by means of the breast-strap of the harness being attached to the clips 14. Now, if it is desired to move the rake in the other direction without backing the animals, it may be done by simply turning them around, the arms 6 turning on the pivots 9, they being brought, together with the arms 4, into the position shown in dotted lines in Fig. I, and into the position shown in full lines, Fig. IV. When thus brought around, the outer ends, 10, of the arms 6 come against the inclined end pieces of the draft-frame 11 at 15, thus limiting the movement of the arms 4 and holding them substantially in line with the teeth 3 of the device. The animals may thus be turned to move the device in either direction, and each time the arms 4 come substantially in line with the teeth 3 the arms 6 stop turning on the pivots 9, and inclined end pieces form positive stops to the arms 4, the action of the parts, of course, being automatic—that is, not requiring the attention of the operator.

The draft-frame may be of any suitable construction, and I have shown it consisting of a rear piece, 16, front pieces, 17, inclined end pieces, as stated, and a cross-piece, 18. The object of this draft-frame is in a measure four-fold, first, being to brace the rake-frame; second, extending toward the rear center, as it does, acts to balance the device on the wheels 2; third, it forms a substantial stop to the arms 4 in their rearward movement; and, fourth, it forms a substantial stop to the arms in their forward movement.

I claim as my invention—

The combination, with a rake-frame having a cross-piece and end pieces forming stops, of the short arms pivoted to the cross-piece, having outer ends adapted to bear against the end pieces, and the draft-arms hinged to the inner ends of the short arms and adapted to bear on the end pieces, substantially as described.

JUDSON ALLEN.

In presence of—
CHARLES ALLIN,
FRANK MARTIN.